UNITED STATES PATENT OFFICE.

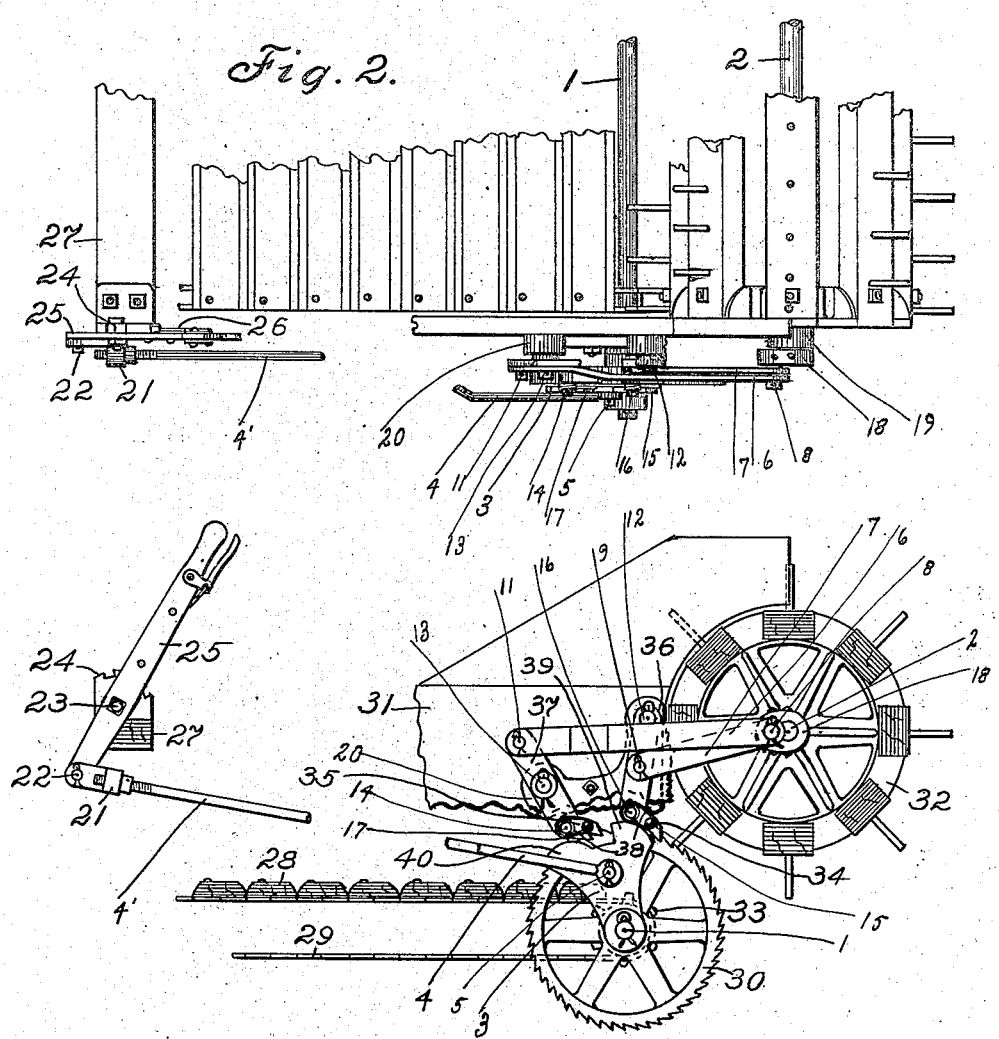

EUGENE BUSWELL, OF WATERLOO, IOWA.

MANURE-SPREADER.

No. 885,908.  Specification of Letters Patent.  Patented April 28, 1908.

Application filed August 19, 1907. Serial No. 389,174.

*To all whom it may concern:*

Be it known that I, EUGENE BUSWELL, a citizen of the United States of America, and a resident of Waterloo, Blackhawk county, Iowa, have invented certain new and useful Improvements in Manure-Spreaders, of which the following is a specification.

My invention relates to improvements in manure spreaders, and the object of my improvements is to provide a convenient, simple and inexpensive ratchet-driving mechanism for the movable apron to be actuated from the shaft of the beater-drum, and so arranged that it will vary the speed of said apron relative to the speed of movement of the said beater-drum and the manure-spreader as a whole. This object I have accomplished by the mechanism which is hereinafter fully described and claimed, and which is illustrated in the drawings annexed hereto, in which:—

Figure 1 is a side elevation of a portion of the rear end of a manure spreader equipped with my improved ratchet-driving-mechanism, and its controlling lever at the front of the machine. Fig. 2 is a partial plan view of the spreader depicting the same parts as shown in Fig. 1.

Similar numbers refer to similar parts throughout the several views.

I have shown a beater-drum 32 mounted in the rear of a spreader-box 31, on a shaft 2, and the latter may be rotated by any suitable source of power. The spreader-box may contain any usual type of slat-apron 28 connected to side-sprocket-chains 29, the latter driven by rear-sprockets 33 in a well-known manner. On one end of the sprocket-wheel-shaft 1 is secured a ratchet-wheel 30, adapted to be driven rearwardly by the action of the alternate pawls 34 and 35, the rear pawl 34 being arranged to begin its driving contact with said ratchet-wheel 30 at the moment that the forward pawl 35 is moving out of contact with said wheel, and vice-versa. The rear pawl 34 is pivoted on a stud 16 to the lower end of a lever 36, and the forward pawl 35 is pivoted on a stud 14 to the lower end of a lever 37. On each of said pawls is an outwardly extending boss, 15 on the pawl 34, and 17 on the pawl 35. A short coil spring 38 is connected to the pivot stud of each pawl and has one end bearing against the upper side of the boss thereon, to aid in keeping said pawls in engagement with the teeth of the ratchet-wheel 30. The lever 37 is medially pivoted on a stud 13 extending laterally from the plate 20, the latter being secured to the spreader-box 31. The lever 36 is pivoted at its upper end to another stud 12 extending from said plate 20. The upper end of the lever 37 is pivoted on a stud 11 to the rear end of a rod 6, and the lever 36 is medially pivoted to the rear end of the rod 7 on a stud 9. Both of the rods 7 and 6 are at their rear ends pivoted to the crank-pin 8 of the short crank 18, the latter being secured to one end of the beater-drum shaft 2.

On the end of the shaft 1 outside of the ratchet-wheel 30, a fan-shaped lever 3 is pivoted, its upper broad-end having two extensions 39 and 40, with curved upper edges. These curved extensions are adapted to contact with the bosses on the pawls at certain times alternately to lift the latter somewhat and cause them to skip one or more teeth on said ratchet-wheel 30, when it is desired to decrease the speed of the latter. When the pawls are in ordinary contact with said ratchet-wheel and at fast speed, the lever 3 does not contact with them, but the pawls may be elevated by the following mechanism. A hand-lever 25 is medially pivoted on a stud 23 to the outside of the rack 24, the latter secured to the cross-bar 27 on the under side of the front of the spreader-box 31. Said lever is provided with the usual form of hand-operated detent 26 adapted to engage the notches in said rack 24. The lower end of the lever 25 is pivoted at 22 to a short bar 21 within which the threaded front end of the connecting-rod 4 may be secured and adjusted. The rear end of said connecting-rod is pivoted to the lever 3 on a stud 5. When the lever 25 is in its rearward position, the pawls 34 and 35 are not engaged by the extensions 39 and 40, and the apron travels at fast speed, but when the lever 25 is put in its forward position, the extensions aforesaid do contact with the bosses 15 and 17, lifting the pawls sufficiently to pass over more than one tooth before dropping and the apron 28 is caused to travel at a lower speed than before. The pawls 34 and 35 are alternately lifted by the action of the respective levers to which they are separately connected and the action of the crank 18 which actuates said levers, and thus the pawl 34 will engage the ratchet-wheel at the exact moment that the pawl 35 is lifted, which results in a continuous driving action on the ratchet-wheel, without any hiatus in the action or unevenness in the motion of the wheel.

In case either spring 38 should be broken, or discarded, the bosses on said pawls will ordinarily be of sufficient weight to cause them to keep in operative engagement with the teeth of the ratchet-wheel.

Having described my invention, what I claim as new, and desire to secure by Letters Patent, is:—

1. In a manure-spreader, the combination of a spreader-box having a beater-drum secured on a rotatable shaft at one end thereof, a movable apron in said box, a shaft provided with means for driving said apron, a ratchet-wheel on one end of said apron-shaft, a crank secured to the beater-drum-shaft, connecting-rods pivoted to said crank and to levers, said levers being fulcrumed to said spreader-box, pawls pivoted to said levers and adapted to alternately engage and separate from said ratchet-wheel to exercise a continuous driving-contact therewith.

2. In a manure-spreader, the combination of a spreader-box having a beater-drum secured on a rotatable shaft at one end thereof, a movable apron in said box, a shaft provided with means for driving said apron, a ratchet-wheel on one end of said apron-shaft, a crank secured to the beater-drum-shaft, connecting-rods pivoted to said crank, levers fulcrumed to said spreader-box and pivoted to said connecting-rods and to pawls, pawls adapted to alternately engage and separate from said ratchet-wheel to exercise a continuous driving-contact thereon, and means for regulating the drop of said pawls whereby the speed of said apron may be varied at will.

3. In a manure-spreader, the combination of a spreader-box having a beater-drum secured on a rotatable shaft at one end thereof, a movable apron in said box, a shaft provided with means for driving said apron, a ratchet-wheel on one end of said apron shaft, a crank secured to said beater-drum-shaft, connecting-rods pivoted to said crank, levers fulcrumed to said spreader-box and pivoted to said connecting-rods, pawls pivotally connected to said levers and adapted to alternately lift and then engage the teeth of said ratchet-wheel to exercise a continuous driving-action thereon, contact-blocks adapted to vary the action of said pawls on said ratchet-wheel so as to cause them to skip a desired number of teeth thereon at each driving-contact, and means for adjustably setting said contact-blocks in a desired position to vary the action of said pawls on said ratchet-wheel.

Signed at Waterloo, Iowa, this 30th day of July, 1907.

EUGENE BUSWELL.

Witnesses:
O. D. YOUNG,
H. M. HARPER.